(12) United States Patent
Teixeira et al.

(10) Patent No.: US 10,104,430 B2
(45) Date of Patent: *Oct. 16, 2018

(54) TIME SHIFTING OF ADVERTISEMENTS IN DIGITAL CONTENT DELIVERY SERVICES

(71) Applicant: OPENTV, INC., San Francisco, CA (US)

(72) Inventors: John Michael Teixeira, Oakland, CA (US); Nicholas Fishwick, San Francisco, CA (US)

(73) Assignee: OPENTV, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/951,174

(22) Filed: Nov. 24, 2015

(65) Prior Publication Data

US 2016/0080809 A1  Mar. 17, 2016

Related U.S. Application Data

(63) Continuation of application No. 13/968,287, filed on Aug. 15, 2013, now Pat. No. 9,232,285.

(51) Int. Cl.
| | | |
|---|---|---|
| *H04N 7/025* | (2006.01) | |
| *H04N 7/10* | (2006.01) | |
| *H04N 7/16* | (2011.01) | |
| *H04N 21/81* | (2011.01) | |
| *H04N 21/6587* | (2011.01) | |
| *H04N 21/458* | (2011.01) | |
| *H04N 21/262* | (2011.01) | |
| *H04N 21/2543* | (2011.01) | |

(Continued)

(52) U.S. Cl.
CPC ...... *H04N 21/458* (2013.01); *H04N 21/25435* (2013.01); *H04N 21/262* (2013.01); *H04N 21/47217* (2013.01); *H04N 21/6587* (2013.01); *H04N 21/812* (2013.01); *H04N 21/8456* (2013.01)

(58) Field of Classification Search
CPC .......... H04N 21/812; H04N 21/44016; H04N 21/25891; H04N 21/2668; H04N 21/25883
USPC ...................................................... 725/32–36
See application file for complete search history.

(56) References Cited

U.S. PATENT DOCUMENTS

| | | | |
|---|---|---|---|
| 8,005,713 B1 | 8/2011 | Sanz-Pastor et al. | |
| 9,232,285 B2 * | 1/2016 | Teixeira | H04N 21/812 |

(Continued)

FOREIGN PATENT DOCUMENTS

| | | |
|---|---|---|
| WO | WO 2014/064212 | 5/2014 |
| WO | WO 2014/064212 A1 | 5/2014 |

OTHER PUBLICATIONS

International Search Report issued in International Application No. PCT/US2014/051366 dated Jan. 14, 2015.

(Continued)

*Primary Examiner* — Fred Peng
(74) *Attorney, Agent, or Firm* — DLA Piper LLP (US)

(57) ABSTRACT

Advertisements included in a stored digital video program are identified and indexed. A user can time shift the advertisements to play out at a different time position in the program or not play the advertisement at all. A user may incur an advertisement debt for skipping or fast forwarding an advertisement. The advertisement debt can be offset by viewing ads, trading the debt with other users or by paying for the debt in another form.

20 Claims, 12 Drawing Sheets

(51) Int. Cl.
*H04N 21/845* (2011.01)
*H04N 21/472* (2011.01)

(56) References Cited

U.S. PATENT DOCUMENTS

| | | | |
|---|---|---|---|
| 2003/0233656 | A1 | 12/2003 | Sie et al. |
| 2008/0109840 | A1 | 5/2008 | Edward et al. |
| 2008/0155616 | A1 | 6/2008 | Logan et al. |
| 2008/0195468 | A1 | 8/2008 | Malik |
| 2009/0094114 | A1* | 4/2009 | Rice ............ G06Q 30/02 705/14.54 |
| 2010/0054707 | A1 | 3/2010 | Karaoguz et al. |
| 2011/0016498 | A1 | 1/2011 | Tsuria et al. |
| 2011/0088057 | A1 | 4/2011 | Udani |
| 2011/0247027 | A1* | 10/2011 | Davis ............ H04N 21/25435 725/5 |
| 2012/0272278 | A1 | 10/2012 | Bedi |
| 2013/0031579 | A1 | 1/2013 | Klappert |
| 2013/0298147 | A1* | 11/2013 | Klein ............ H04N 21/23424 725/13 |
| 2014/0075469 | A1 | 3/2014 | Zhao |
| 2014/0109142 | A1* | 4/2014 | van Coppenolle .... G06Q 30/06 725/46 |
| 2014/0123161 | A1* | 5/2014 | van Coppenolle ............ H04L 65/4076 725/8 |
| 2016/0071151 | A1* | 3/2016 | Kramer ............ H04N 21/812 725/34 |
| 2017/0223131 | A1* | 8/2017 | Raleigh ............ H04L 67/2823 |

OTHER PUBLICATIONS

Written Opinion issued in International Application No. PCT/US2014/051366 dated Jan. 14, 2015.
European Seach Report issued in Application No. EP 14 83 6329 dated Feb. 2, 2017.
Written Opinion issued in Singapore Application No. 11201600844V dated Nov. 11, 2016.
Written Opinion issued in Singapore Application No. 11201600844V dated Jun. 9, 2017.
Examination Report Issued in Australian application No. 2014306435 dated Aug. 16, 2017.
Mexican Office Action issued in Application No. MX/a/2016/001919 dated Nov. 8, 2017.
English Translation of Mexican Office Action issued in Application No. MX/a/2016/001919 dated Nov. 8, 2017.
Written Opinion issued in Application No. 11201600844V dated Mar. 6, 2018.

* cited by examiner

TIME SHIFTING OF ADVERTISEMENTS IN DIGITAL CONTENT DELIVERY SERVICES

CROSS REFERENCE TO RELATED APPLICATIONS

This application is a continuation of U.S. patent application Ser. No. 13/968,287, filed Aug. 15, 2013, which is incorporated by reference in its entirety.

BACKGROUND

This document relates to delivery of advertisements along with digital contents such as digital videos, including techniques and systems related to delivery of digital contents and advertisements in connection with digital video recorders.

Services for providing various digital contents such as digital videos are often accompanied with advertisements because advertisements can be a significant source of revenue to content or service providers. Therefore, content or service providers prefer that viewers watch or listen to advertisements presented along with their contents such as digital video contents. However, certain users often would rather watch the program itself and skip the advertisement. Those and other opposing interests with respect to advertisements have led to development of various technologies for delivering advertisements while reducing or minimizing skipping of the advertisements by users. For example, some content or service providers have begun embedding advertisements into their content, or deployed other technologies that make it hard to remove advertisements or skip past the ads. Many consumers prefer to buy digital video recording equipment that provides control to skip past advertisements.

SUMMARY

Techniques that allow a viewer to time shift advertisements during viewing of a program include conditionally allowing the viewer to watch the advertisements at a time of the user's choice or completely skip the ads. In some embodiments, a viewer can select to watch all advertisements at a specific time relative to a program (e.g., at the beginning or at the end of a program). In some embodiments, the user's control of time-shifting advertisements is based on ad viewing points the user has available in his ad debt account. Points are debited from the user's ad debt account for every ad not watched or watched in trick mode and points are credited to the user's ad debt account for every ad watched. The point balance of the user's ad debt account may also be tied to real world money by the user being able to opt out of advertisements in favor of money payments.

In one disclosed aspect, a method of allowing a user to control a time for playback of an advertisement includes receiving a user input to time-shift an advertisement from a first playback time at which the advertisement is to be played during playback of a video program to a second playback time that is different from the first playback time and selectively playing back, based on the user input and an advertisement credit policy, the advertisement to the user.

In another aspect, a content playback apparatus is disclosed. The content playback apparatus includes a content receiver module that receives, from a content provider, a bitstream comprising a static content and a shiftable content, wherein the bitstream includes a playback time information for the shiftable content, a storage module that stores the static content and the shiftable content, a bitstream analysis module that generates an index table comprising indices for independently accessing the shiftable content, a credit determination module that determines an amount of credit points available to the user to control playback of the shiftable content, and a playback control module that controls playback of the shiftable content based on a user input and the amount of credit points available to the user.

In another aspect, a computer-implemented method of managing advertisement playbacks in a content network is disclosed. The method includes assigning values to programming segments, assigning values to advertisements, maintaining a user's advertisement account, wherein the advertisement account comprises advertisement points for the user, and adjusting, in response to the user playing back a programming segment or an advertisement, the advertisement points for the user.

In yet another aspect, a disclosed server apparatus operable in a content network includes a playback value storage module that stores a list of digital programs and advertisements available for viewing in the content network and corresponding playback values, an account storage module that stores information about advertisement accounts for a plurality of users of the content network, a playback report reception module that receives playback reports from a plurality of user devices, wherein a playback report includes information indicative of a digital program viewing or an advertisement viewing by a user, and an account balance management module that manages advertisement account points for the users based on the received playback reports.

These, and other, aspects are described below in the drawings, the description and the claims.

BRIEF DESCRIPTION OF THE DRAWINGS

Like reference symbols in the various drawings indicate like elements.

DETAILED DESCRIPTION

Figure 1:
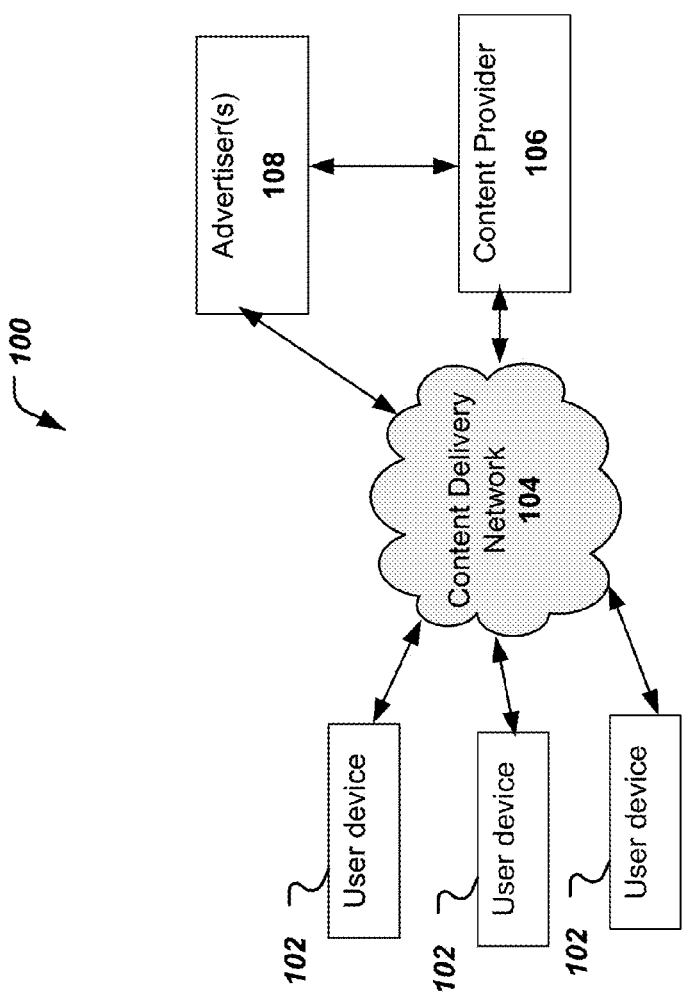
FIG. 1 depicts high level architecture of a digital program delivery system.

Digital video recorders (DVRs) are commonly used to record television programs for viewing at a later time. Open source projects such as Comskip, ShowAnalyzer, and MythTV can detect commercial breaks in MPEG (moving picture experts group) streams stored in the DVR and allow a user to skip past the advertisements or commercials in the recorded television programs. However, commercial DVR manufacturers generally do not provide such ads-skipping technology in their DVR products for fear of upsetting the advertisers who are a source of revenue for the content delivery ecosystem. Therefore, this technology is largely unused in today's commercial DVRs.

Television viewers, however, often do not know or care about appeasing advertisers and desire ad-skipping feature from their DVR manufacturers.

Currently, there are no mainstream products available that can meet the opposing goals of advertisers and viewers such that advertisers can generate revenue based on ad display to the users and users have some level of control of whether they want to watch ads or not.

The techniques and systems disclosed in this document provide DVRs that enable users to shift a location of an advertisement at a user-selected location in time relative to the digital program and can be used, among other benefits, to address the opposing interests of viewers and advertisers with respect to advertisements added to digital contents. For example, in some disclosed embodiments, a DVR can be equipped with technology that identifies advertisements received and stored with audio/video programming. A user could choose, via a menu (e.g., an on-screen menu), the option to analyze a DVR recording, detect all the advertisements and subsequently shift these advertisements to a different time or different times in the program, e.g., at the front of the program or in the middle of the program, without completely avoiding the advertisements.

In some disclosed embodiments, watching ads can be treated as a valuable activity with credit/debit points associated with the ads watching by a user to provide incentives to the user. The ads watching by a user can be tracked in an ad debt account that a user can borrow from or buy out of. For example, a user may be rewarded for watching ads, or may have to pay for skipping ads. This and the time-shifting feature give a user some level of control of whether the user wants to watch ads with a certain program, defer watching ads or skip watching ads and pay for it, e.g., using previously accumulated ad-watching credit points or some other way.

In some embodiments, a user may be allowed to create an advertisement viewing account that the user can trade for certain rewards, e.g., getting a cash reward, trading among programs from same or different content providers or trading the ads watching credits or debts with other users.

In some embodiments, content viewed by a user can be divided into two categories—a first category of time-shiftable content segments such as advertisements, credits (cast listing) at the end of television episodes, etc. and a second category of static contents or programs such as segments of a movie or television program. The above-discussed applications of the technology can be extended to so that a user is credited for time-shiftable content segments the user watches, e.g., without time-shifting, and conversely points are taken out of a user's ads debt account for time-shiftable content that the user ends up actually time-shifting.

Time Shifting of Advertisements

Time shifting of one or more advertisements can be done without changing the media file by recording index points and skipping through the media file to those index points. For example, a segment table can be generated for a movie or a television show episode stored in memory. The segment table may include a list of index points that can be accessed in succession to play back the content to a user. An index point is a marker of a segment stored in the memory of the DVR and can be, for example, one or more memory location pointers for the block of data for the segment in the memory or an identification of the segment (e.g., a file name associated with the segment). The user can use the index points to, for example, play the commercials at the beginning of the presentation of a particular TV program. Rules can be applied to further adjust the playback to the advertisers needs. For example, the viewing of the commercial block could require play back to operate with trick modes (like Fast-Forward) disabled. Front loading commercials may appeal to viewers since the remainder of the presentation would be ad-free. Front-loading commercials may appeal to advertisers because it insures that their advertisements are not fast forwarded as can be the case in standard DVR playback. A counter could be added to track how often the ads are played back in this front-loaded block to further cater to the advertisers.

In this context, "time shifting" refers to changing relative temporal position of a segment within the program. For example, a typical half-hour television program includes a twelve minute show segment, followed by 3 minutes of commercials, followed by a second twelve minute show segment, followed by a second 3-minute commercial segment. "Time-shifting" occurs when, e.g., both commercial segments are viewed at the beginning of the half-hour time interval, or when the first commercial segment is skipped, etc. In this context, the show segments are static because the relative positions of these segments (i.e., the first segment is viewed first and the second segment is viewed next) remain static regardless when a viewer plays the program back. This time shifting feature at the user's DVR provides the user with a user operation option to enable use to select a desired time for viewing the advertisements. This aspect of the disclosed technology is different from other advertisement mechanisms where an advertisement server controls insertion of the advertisements without flexibility on the user end. However, content storage under a user's control may include not just a local storage device such as a hard disk in a DVR, but could include a storage device in the user's home network (e.g., a multi-room architecture in which a user can access programs stored on a device in one room from a user device in another room). The storage under the user's control may also include network-based storage such as, e.g., a network-DVR or cloud-based storage of content.

In some conventional content networks, a network server such as an internet protocol television (IPTV) server controls insertion of advertisements in designated time slots interspersed with a television program, a movie or a video segment. Typically, the advertisement time slots are predetermined by a schedule, e.g., a national advertisement time slot, a regional advertisement time slot, a local advertisement time slot, etc. Thus, a conventional content server can insert certain advertisements (which may be personalized for a user) only in time slots designated for a commercial break of for that type of advertisement and treats the remaining content as a monolithic content segment (i.e., played back linearly, without any breaks). By contrast, the techniques further disclosed in this document allow for indexing content based on any segmentation (e.g., one minute video segments) and allows advertisements to be time shifted from time slots in which they are received to different time slots in which the ads are displayed to the user.

Credit Based Advertisement Viewing

The disclosed time shifting feature can be implemented in a system where a viewer can also watch TV Ad Free while making up time for watching advertisements at other times. A viewer can do so by skipping ads (manually or automatically) and by building up an Ad Debt. At certain points in time the system decides that the viewer needs to watch ads to reduce the Ad Debt and the viewer can do that by watching a collection of ads upfront, collected from their recordings and viewed together back to back.

The Ad Debt information of a viewer can be explicitly presented to the viewer on the user interface of the DVR or can be hidden in the background. When the Viewer collects ads to view from a particular recording, the actual ads presented could be aggregated from any number of their recordings. This process is opaque to the viewer.

In addition, ads can be added to the Ad Collection from a special Ad File, which can include, for example, a set of Pushed Ads.

With the above feature of aggregating advertisements, the viewer is allowed to watch ads upfront of a show at the viewer's choice. The ads to be viewed can be aggregated form available recordings stored in the DVR, plus any specifically PUSHED to the box, or pulled on an "on demand" basis. The number of Ads in the Collection is dependent on the Viewers aggregated Ad Debt.

FIG. 1 illustrates a network architecture 100 in which multiple user devices 102 are coupled to a content delivery network 104 and configured to receive content from a content provider 106. The content provider 104 may include advertisements (commercials) from an advertiser 108 in commercial time slots in the programming provided by the content provider 104. Alternatively, the advertiser 108 may display advertisements to the users based on a business arrangement with the operator of the content delivery network 104 in pre-designated time slots within the programming provided by the content provider 106. These ads may be pre-cached on the user devices 102.

By way of non-limiting examples, a user device 102 could be a standalone set-top box coupled to digital storage (e.g., a personal video recorder PVR or a digital video recorder DVR), a computer, a smartphone, a tablet computer and so on. By way of non-limiting examples, the content delivery network 104 may be a fiber to the curb network, a hybrid fiber coaxial cable network, a satellite network, a wireless network and so on.

Examples of a Time-Shifting Process

Figure 2:
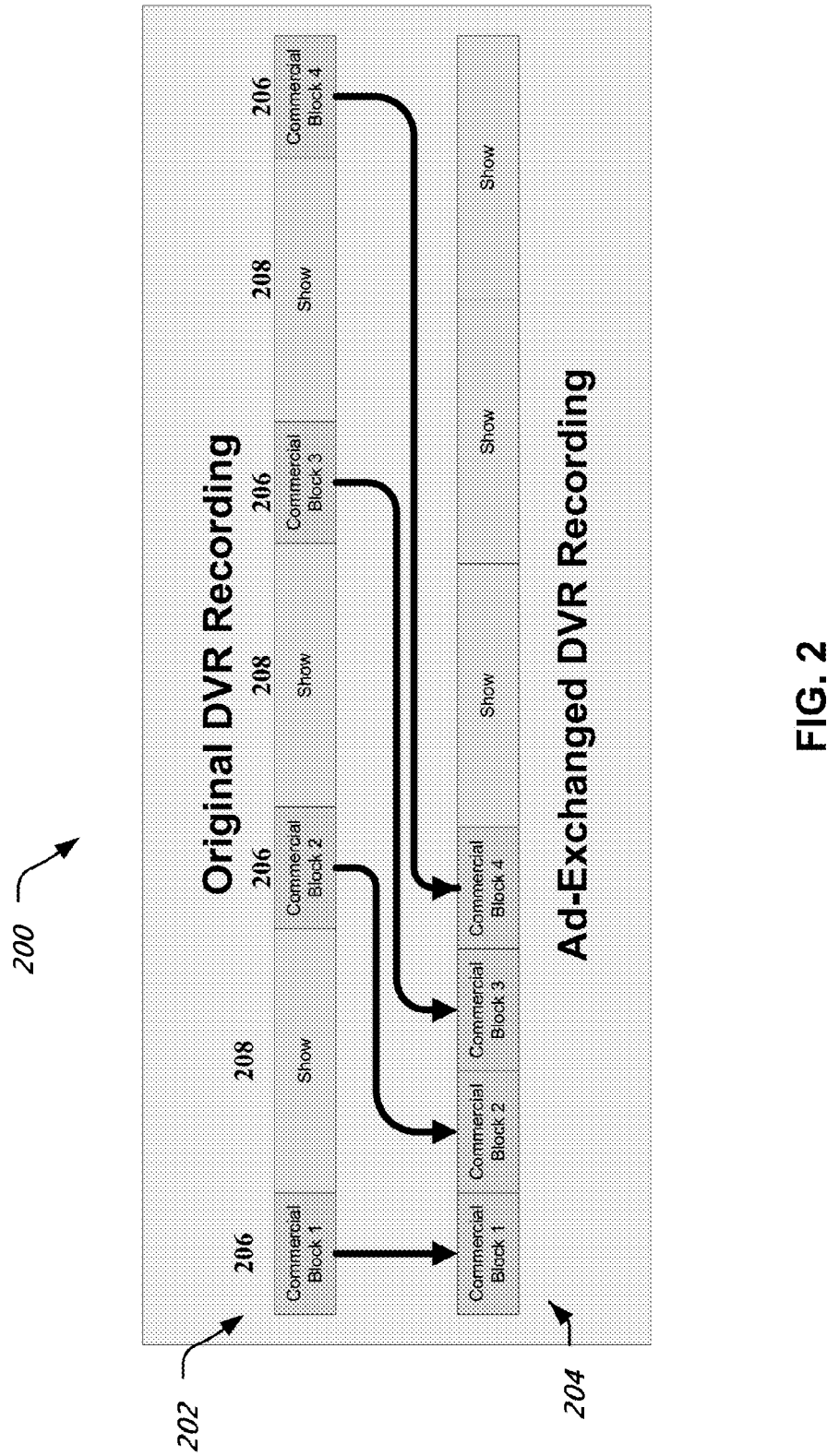
FIG. 2 depicts an example of time-shifting advertisements using an index table.

FIG. 2 depicts an example embodiment 200 in which time-shifting of content is performed from original content 202 to time-shifted content 204. The original content, which is depicted along a timeline from left to right (left side representing earliest received content or content to be presented first), includes one or more blocks 206 of commercials (advertisements). The blocks 206 may represent time-shiftable content. The original content 202 also includes one or more show blocks 208, which represent static content that cannot be time-shifted. In some embodiments, the shifting of segments 206 is achieved by actually moving the commercial blocks within storage memory. In some embodiments, the shifting of segments 206 is achieved by re-arranging a list of indices that corresponds to the stored program. During run-time, this list may be linearly traversed down for presentation. Each index in the list may be a pointer to a memory address where the corresponding program segment can be fetched from.

Examples of Advertisement Transactions

Each advertisement can be assigned a value and different advertisements can have different assigned values in implementing the disclosed time shifting technology. Higher valued ads incur a larger debt level than other lower value ads when skipped.

In some embodiments, a user may be asked to satisfy the ad debt purely based on a numerical debt value, or have it more discrete where any high value ads skipped can only be replaced later with similarly graded high value ads.

In some embodiments, skipped ads can be satisfied later by watched ads by the same ad merchant e.g. Mercedes/or by the same Ad Agency.

A new advertising consumption model can be set where viewers need only consume so many Ad points during a viewing period. The system is able to manage the display of ads seamlessly to the viewer, based on previous ad consumption—hence high value ads can replace low value in one slot, where one household is forced to watch three ads at an ad break, another household may need to watch only one, or none at all. Viewers may preemptively consume ads, in order to secure an ad free viewing experience for a favorite show.

It could be an option for viewers to directly purchase Ad Points, and thus alleviate their Ad Debt, and hence go on watching content Ad free.

If recordings are stored for extended periods of time, then time-sensitive ads may lose their relevancy. In some embodiments, time-sensitive ads such as commercials for upcoming sporting events, specific broadcasts, movie openings, and so on could be switched out to updated versions thus increasing the value to the advertiser.

Figure 3:
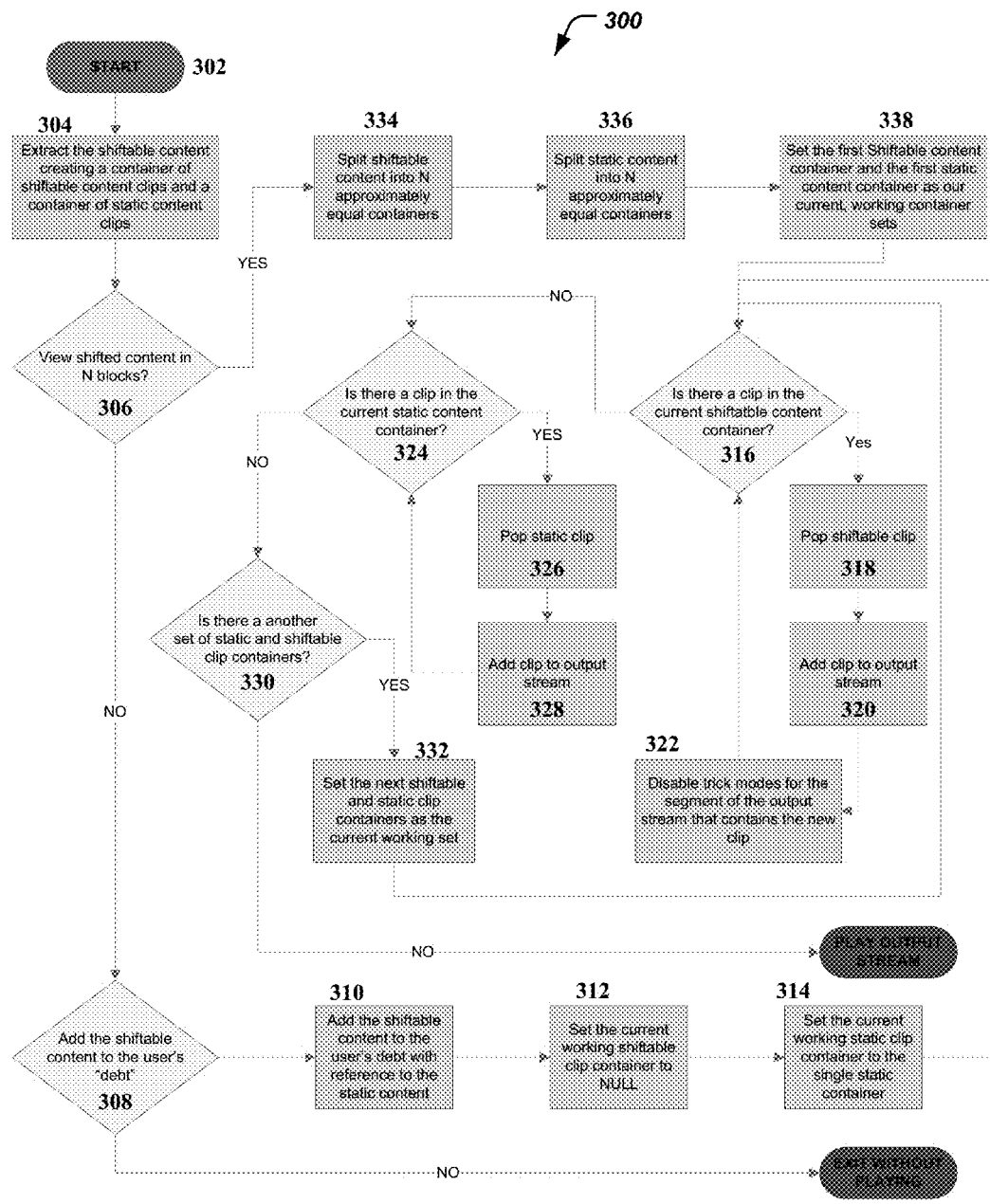
FIG. 3 is a flowchart representation of a method of generating and playing back program content having time-shifted advertisements.

FIG. 3 is a flowchart representation of a method 300 of time shifting and presenting for display an advertisement. The method 300 can be used for shifting sub-content (e.g. TV commercials) into viewing blocks that are more desirable for the user. In some embodiments, the content is split into N viewing blocks (e.g., three commercials in a 3 minute ad slot). The pseudo-code listed in Table I, which forms a part of the present specification, shows the possible implementation for a single, front-loaded viewing block (i.e., ads are moved to the beginning of a show), splitting the sub-content into 2 viewing blocks, and adding the sub-content to the debt management system. The entire program viewed by a viewer may be organized as "containers" of time-shiftable content blocks (e.g., ads or other content) and "static" content that is not time shifted. Each block may represent a logically contiguous portion of a program that is presented without breaks. Conventional delivery of bitstreams does not differentiate between "static" or "shiftable" content and all content sent to a user device 102 is generally expected to be played back "as sent." In some embodiments, the bitstream that carries the content may include metadata that contains information about whether a given segment is to be treated as static or shiftable. In some embodiments, content segmentation and classification of each segment as being static or shiftable may be performed by a human and/or an artificial intelligence algorithm, e.g., an audio or video recognition engine that determines a user's interest level in content segments.

Starting at 302, where digital video content along with interspersed advertisements may be stored on a storage device of a DVR, at 304, the method 300 extracts the shiftable content (e.g., ads or other content), thereby creating a first container of shiftable content clips and a second container of static content clips. The containers may only be logically grouped together (e.g., using an index table described previously).

At 306, the method 300 checks whether the user desires to view shifted content in N blocks (or segments). If, at 308, the user has decided not to view the shifted content, then the corresponding ad points are added to the user's debt. If the adding of these ad points creates a user debt that is greater than a threshold for maximum allowed debt for the user, the playback of the static content is not performed. The method 300 terminates without playing the user-requested content.

If, on the other hand, there is sufficient credit (ad points) in the user's account, at 310, the method 300 adds the shiftable content to the user's debt with reference to the static content. The method 300 then proceeds to set, at 312, the current working shiftable clip container to NULL and, at 314, sets the current working static clip container to the single static container.

Next, at 316, a determination is made whether there is a clip (segment) present in the current shiftable content container. If a clip is present, then, at 318, the shiftable clip is popped, i.e., made available for display to the user. At 320, the clip is added to the output stream that is played out to the user. During the playback, at 322, during the time the pop clip is being played back, trick modes (e.g., fast forward or skipping) may be disabled, based on an ad display policy or the amount of credit available to the user for enabling trick modes during ad playbacks. The method 300 then loops back to 316, for any additional advertisement clips to be displayed, described before.

If the method 300 determines, at 316, that no clips of the currently shiftable content are available, then the method 300 performs a check, at 324, for whether currently static content (e.g. a television program) is available in the content container for displaying to the viewer. When a static content clip is available, at 326, the method 300 pops a static clip (similar to 318) and, at 328, the clip is added to the output stream for displaying to the user (similar to 320). The method then checks for additional current static clips, as described in 324.

If, at 324, the method 300 determines that no additional static and shiftable clips are available, then, at 330, the method 300 checks whether additional clip containers that include static and/or shiftable clips are available. If no additional clips are available, the method 300 plays out the assembled output stream.

Referring back to the check performed at 306, when the user decides to watch the shiftable content, e.g., advertisements, then, at 334, the method 300 splits the shiftable content into about N approximately equal containers. At 336, the method 336 splits the static content into approximately equal sized containers. Next, the method 300, at 338, sets the first static content container and the first shiftable content container has a first working container step and continues with 316, as previously described.

Figure 4:
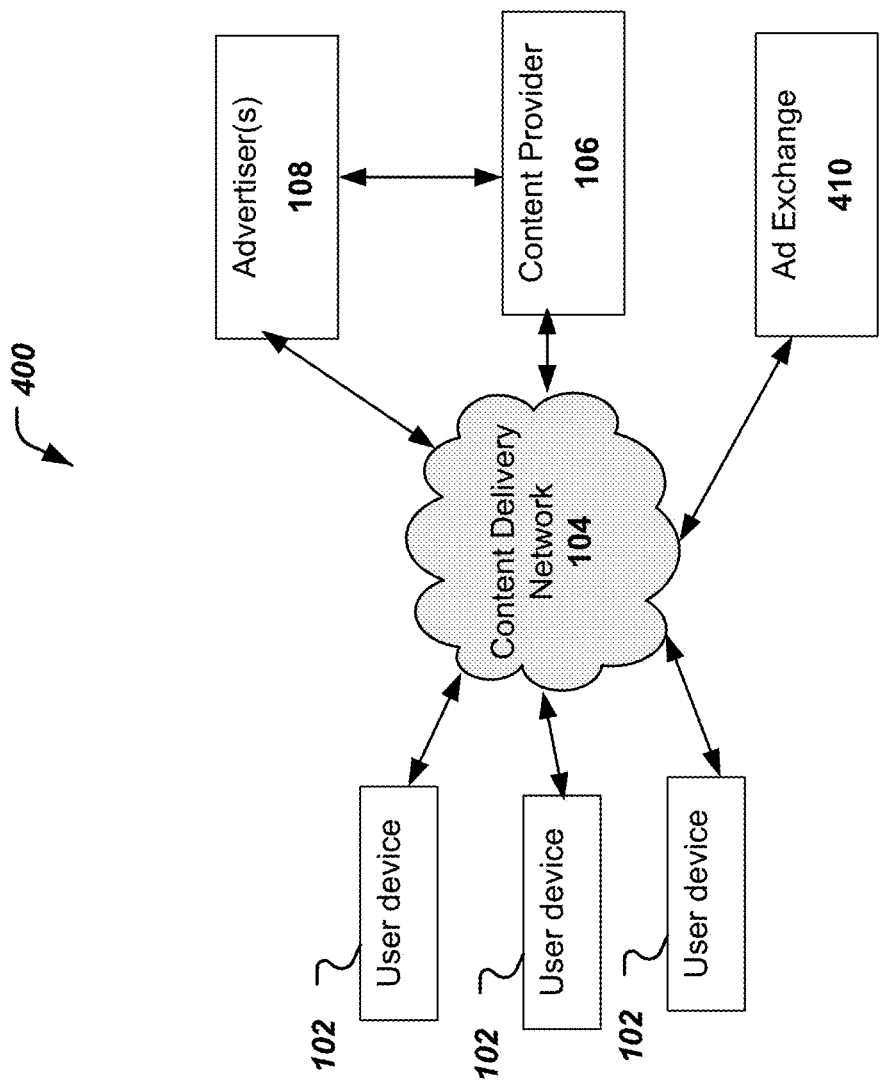
FIG. 4 depicts an example of a digital program delivery system including an ad exchange server.

FIG. 4 depicts a network architecture 400 that is similar to the network architecture 100, previously described with reference to FIG. 1. One difference being that the network architecture 400 includes an Ad exchange server 410, which is communicatively coupled to the other entities in the architecture 400, and may be operated and controlled by either the content delivery network operator (e.g., cable operators such as Time Warner and Cox, satellite television operators such as DirecTV, etc., the advertiser or the content provider or may be operated by another business entity (e.g., Disney, CBS, etc.) that is in a business relationship with the other operators.

An ad watching scheme could have viewers earn points for watching ads, and spending points when skipping ads. Thus it is not just debt, but credit too; an Ad Watching Points Account (also called ad debt account). Thus Ads can be given "skip costs" independently of its "watch value"—the higher the skip cost the greater the cost of the Ad to the Ad Agency. This enables the TV Operator/Broadcaster/Unicaster to create greater inventory value, independently and on top of the viewing numbers.

The points associated with an Ad, and the points earned by watching said Ads can be dependent on the level of engagement the viewer shows. Ad viewing accounts can be used in conjunction with Engagement Measures, for example Interactive Ads, Telescoped Ads and Eyeball Tracking Extra points are earned if the viewer interacts with the advertisement (whether that is on the primary or secondary screen).

Assigning Values to Segments

Figure 5:
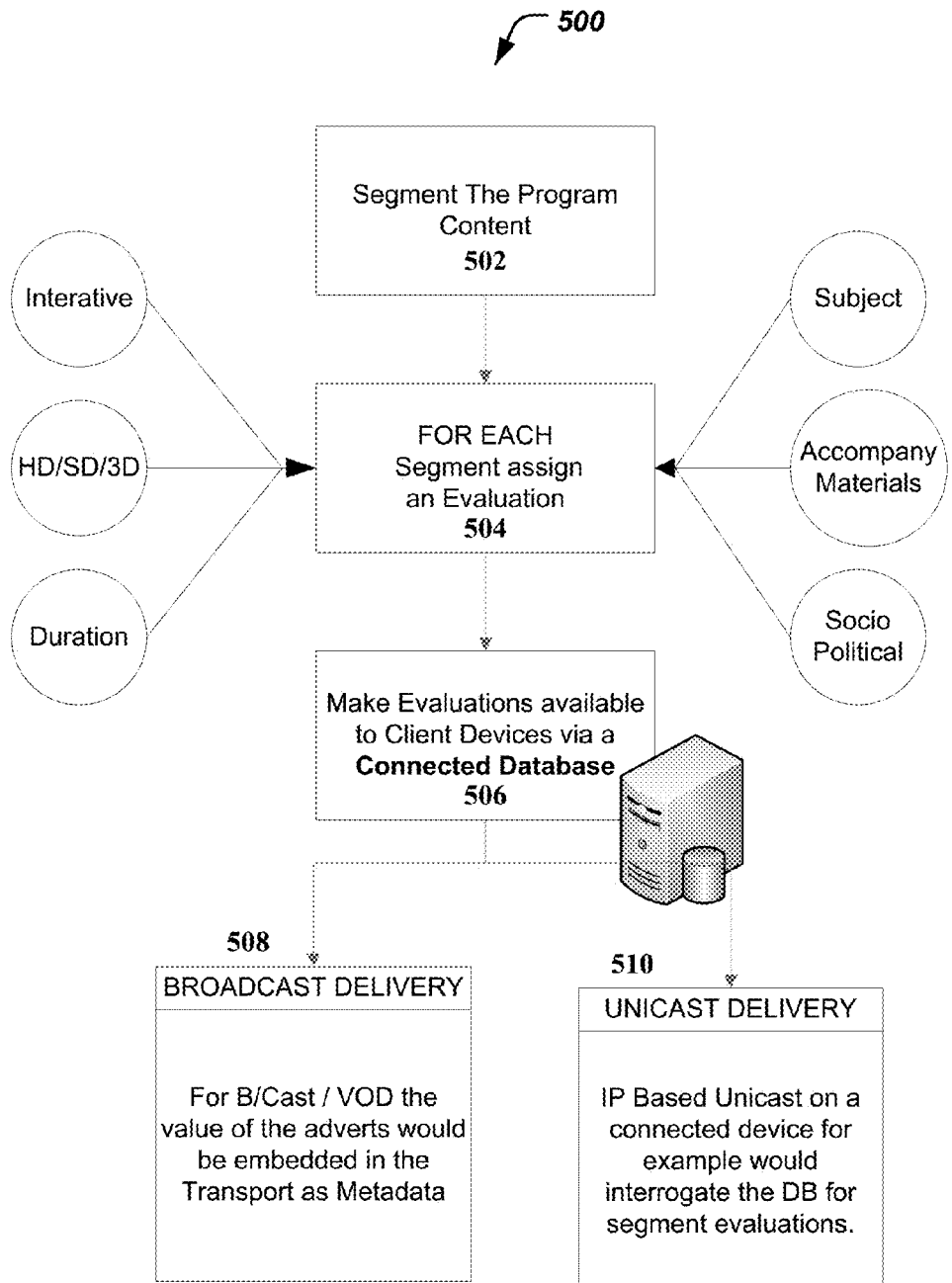
FIG. 5 depicts an example process of assigning values to program segments.

FIG. 5 depicts an example process of assigning values to program segments. At 502, the program content is segmented into multiple logical segments. The segmentation may be performed based on time (e.g., 5 minute segments) or based on scene changes in the program, or intra-coded frames in the program, or at the boundaries between programming and commercials. In some embodiments, the segmentation may be performed by a human user by segmenting based on content itself. For example, in an action movie, a car chase scene may be segmented into a first segment, followed by a foot-pursuit scene, followed by a first fight scene, etc. At 504, for each segment a valuation is assigned. Different measures, as described in this document, can be used in different embodiments. At 506, the evaluations, i.e., points associated with each segment, are made available to the client devices (user devices 102) using a connected database in the system. In some embodiments, the evaluations are communicated to the user devices via a unicast delivery scheme 510 in which the user device 102 communicates with the evaluation database and receives segment evaluations. In some embodiments, the evaluations are communicated to the user devices via a multicast/broadcast delivery scheme 508 in which the evaluations are included with the content being transferred to the user devices as metadata associated with the programming.

Assigning Values to Advertisements

The PayTV Industry already indirectly assigns values to all broadcast and On Demand Advertisements. These evaluations are traditionally based primarily on the expected viewership or ratings of the Ad Slot, and the demographic of the anticipated audience. The main impact of introducing a system of conditional Ad viewing is that viewership numbers no longer apply to the evaluation—instead more intrinsic characteristics identify the value of the advert. These characteristics may be of the ad itself, for example (but not limited to):

Duration of Advertisement

With a conditional system where ads are removed or inserted into the viewing experience the actual ad duration can be considerably more flexible—and hence not all ads are the exact same duration are based so strictly on durational templates.

Resolution of ads—e.g., SD/HD or 3D—higher resolution ads may be assigned greater points for viewing Interactive or Passive—The onset of different viewing devices as well as smarter PayTV devices enables adverts to have interactive components to them. These interactive components can be on the primary screen, second screen, phone or remote control; but as an intrinsic part of the advert they will be considered in the value of the Ad. Thus, passive or interactive advertisement may have different viewing points associated with them. For example, in some embodiments, interactive ads may have more advertisement points associated with them than passive ads.

Telescoped or Not—One subset of the Interactive Ad allows an interested viewer to telescope to longer more involved adverts about the same product, company, offering. This set advertisement features will contribute to the considered ad evaluation. For example, in some embodiments, telescoped ads may have higher advertisement points associated with them.

A viewer's profile could also change the Ad's value simply by being of a certain demographic. The viewer, by simply watching the ad, will inherently define the Ads value. An advert for a muscle car will have a higher intrinsic impact and potential value when watched by a man of a certain age and income bracket; compared to a teenage girl. Hence the viewers themselves could change the value of ads.

Assigning Values to Programming Segments

In some embodiments, an evaluation (or a value) may be assigned to any segment of a Program. The program/event would be segmented based on scene or content, and values assigned to each of those segments. The value can be zero. The purpose of assigning value is to assign a value to the sponsors of that program—this may be based on:

Product Placement being in that segment (possibly making that portion of content high value)

Political Messaging built in to the drama/acting/scene

Federal Cultural Dollars—organizations can look at education through programming in the same way as advertisers do. Credits achieved by watching social conscience broadening shows.

Rating Competitions—some programs may reward viewers simply for watching the program. This could be a useful tool when trying to establish new programming, or to people to watch the news.

Accumulating Credit During Playback

The Credit/Debt account system can be as transparent or opaque as the Network Operator wants. In an opaque system there is greater opportunity for greater feeling of control by the Viewer on what ads are watched, when to watch them, thereby giving a feeling of empowerment to the user.

Greater opportunity for Operator to monetize adverts: By allowing advertiser to provide rewards to user for watching an Ad, the operator enables the advertiser to provide an artificial value incentive to watch their Ad/Segment. This would be specifically valuable to social and political organizations.

Assigning credits to content segments also enables the Operator to create a market on top of the adspace that already exists. An advertiser pays the Operator more to artificially increase the Evaluation of their Ad—since this encourages more viewers to watch their ads.

Translating Virtual Currency into real Money: the Operator can further monetize their Ad inventory by adopting a page out of the casual gaming playbook. By allowing Viewers to amass Debt, but then let them pay that debt down with real currency, and thus enabling the Viewer to continue with a reduced ad playback experience.

Each time a whole segment is watched the valuation of that content is credited to the viewers Ad Watching Account. Note during the watching of the segment the valuation of that segment can be increased or decreased by the demographic profile of the Viewer themselves. Hence two neighbors watching the same segment could get different evaluations based on their profile data and how well the Segment content is targeted and relevant to themselves.

It could also be advantageous to give visual feedback to the Viewer as to how many credits a particular Program could earn them (for Example the News, Political Campaign Ad)—and show this event information in the Guide or in an overlay graphic in the program itself.

Figure 6:
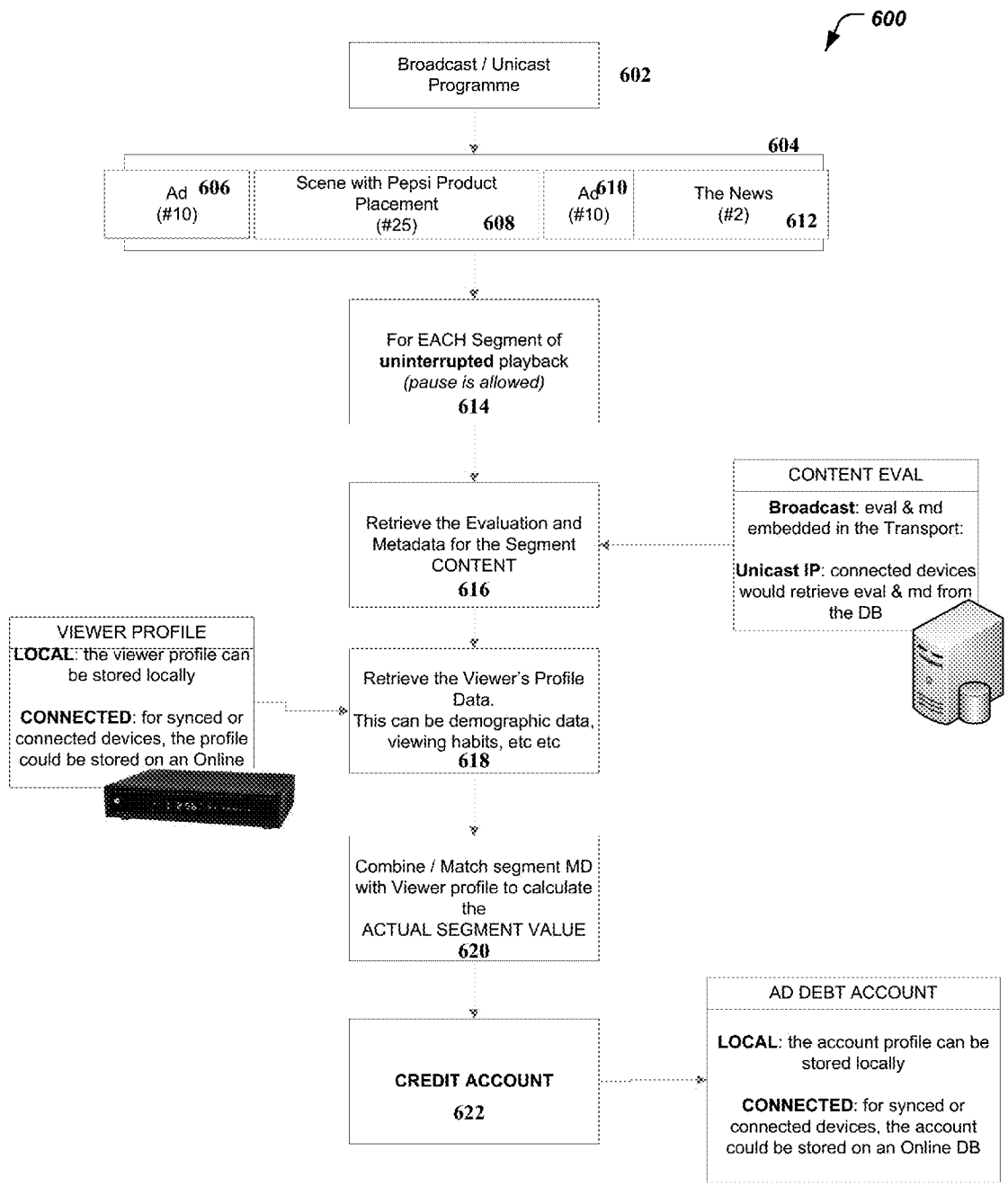
FIG. 6 depicts an example process of accumulating credit during playback.

FIG. 6 depicts an example method 600 of accumulating credit during playback. At 602, a program may be broadcast or unicast to a user device. The program may be sent to the user device in a containerized format 604, as previously described. For example, the program may include an ad 606, followed by a program segment 608, which may have an embedded ad, another ad 610 and a second program segment 612. For each segment, during its playback (614), the method 600 retrieves evaluation and metadata for each segment (616). As previously described, the evaluations may have been received using a unicast or a multicast/broadcast delivery method. At 618, the method 600 receives the user's profile data. Various embodiments of user profile data have been disclosed in this document. At 620, the method 600 combines the evaluation metadata with the user's profile to derive an actual value of credit points associated with the segment being played back. At 622, the method 600 credits the calculated credit points to the user's Ad debt account. In some embodiments, the ad debt account is locally maintained on the user device. In some embodiments, the ad debt account is maintained remotely in the network (e.g., on the Ad exchange server 410).

Accumulating Debt During Playback

During playback of a program whether it is from broadcast via review buffer, On Demand or IP Streamed—the viewer at any point can choose to skip a segment of the program. In doing so the perceived value of the skipped segment will be added to the Viewers account as DEBT.

From the Operational standpoint of the Operator there are multiple options for evaluation the cost of missing that segment. The options include (but are not limited to):

The segment cost—an evaluation given to the segment itself, based on the content surround the segment The content cost—an evaluation of the content's value, which may have been artificially inflated deliberately by the segments patron (see above for details)

The missed opportunity—this would be the evaluation of the content and Viewer's profile. The evaluation may be based on previously discussed evaluation techniques.

A flat rate cost—simplest model for the viewer to understand

Conditional Skipping During Playback

The Credit/Debt account system can be as transparent or opaque as the Network Operator wants. In an opaque system there is greater opportunity for the Viewer to feel in control more of their viewing experience by the Viewer by skipping Ads when they most want to, and watch Ads when it is most convenient or of interest to them. But there cannot be an indefinite level of ad free viewing (unless specifically paid for by the Viewer). Hence, in some embodiments, the incentive of watching Ads is only there if and only if there is a threshold to the debt they can accumulate. Once the debt ceiling is reached skipping ads or segments as a control is removed from the Viewer. Another example of an incentive may be such that, in some embodiments, a user may not be able to delete current recordings until ad debt is paid down.

Figure 7:
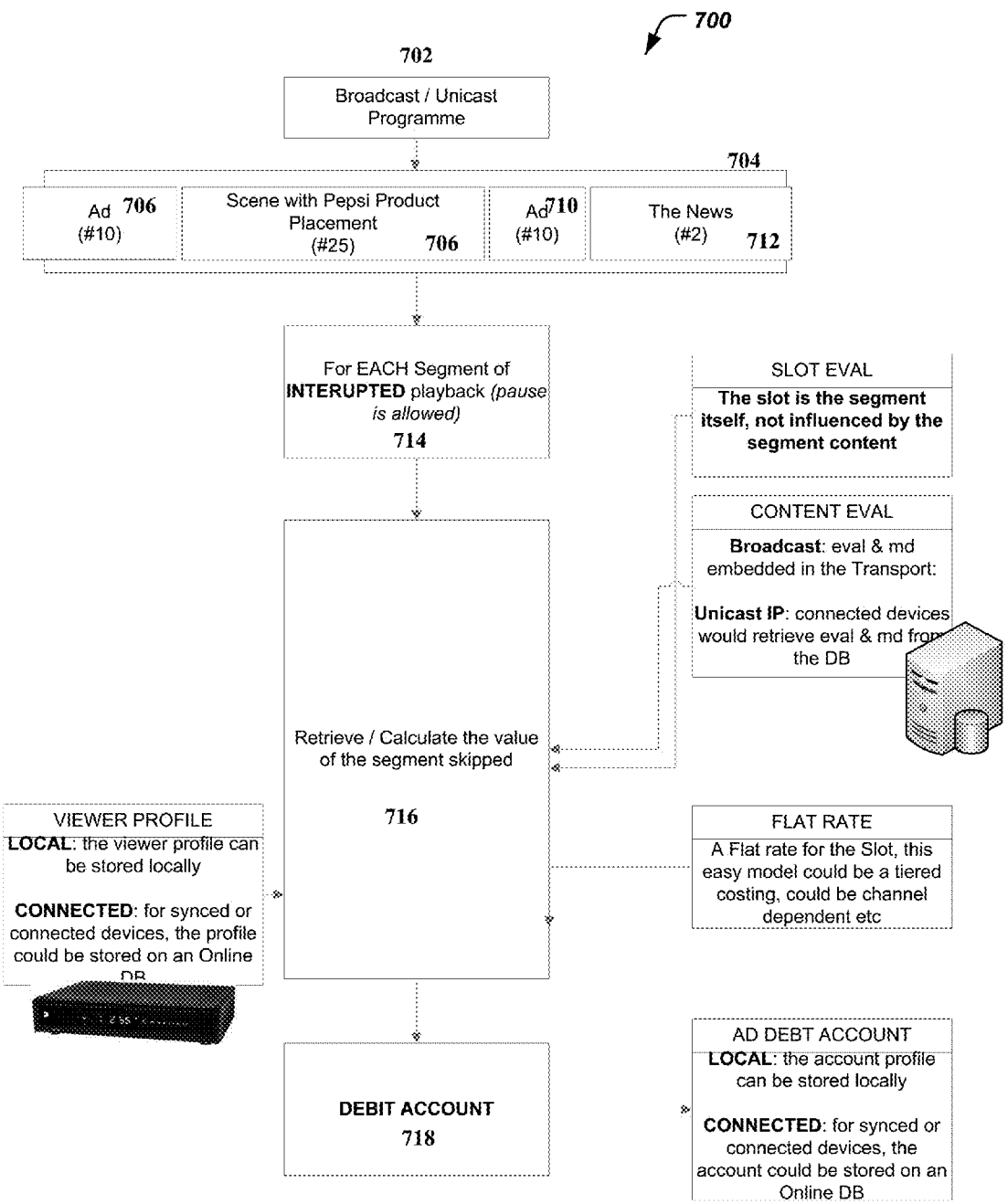
FIG. 7 depicts an example process of accumulating debt during playback.

FIG. 7 is a flowchart description of a method 700 of accumulating debt during playback. At 702, a program may be broadcast or unicast to a user device. The program may be sent to the user device in a containerized format 704, as previously described. For example, the program may include an ad 706, followed by a program segment 708, which may have an embedded ad, another ad 710 and a second program segment 712. For each interrupted segment, during its playback (714), the method 700 retrieves evaluation and metadata for each segment and calculates the value of the segment being skipped (716). As previously described, the calculations 716 may depend on evaluation of the time slot in which the segment is skipped, the evaluation of the content being skipped, the user's profile, a rate structure being used (ad debt rules), and so on. At 718, the method 700 debits the calculated debit points from the user's Ad debt account. In some embodiments, the ad debt account is locally maintained on the user device. In some embodiments, the ad debt account is maintained remotely in the network (e.g., on the Ad exchange server 410).

Figure 8:
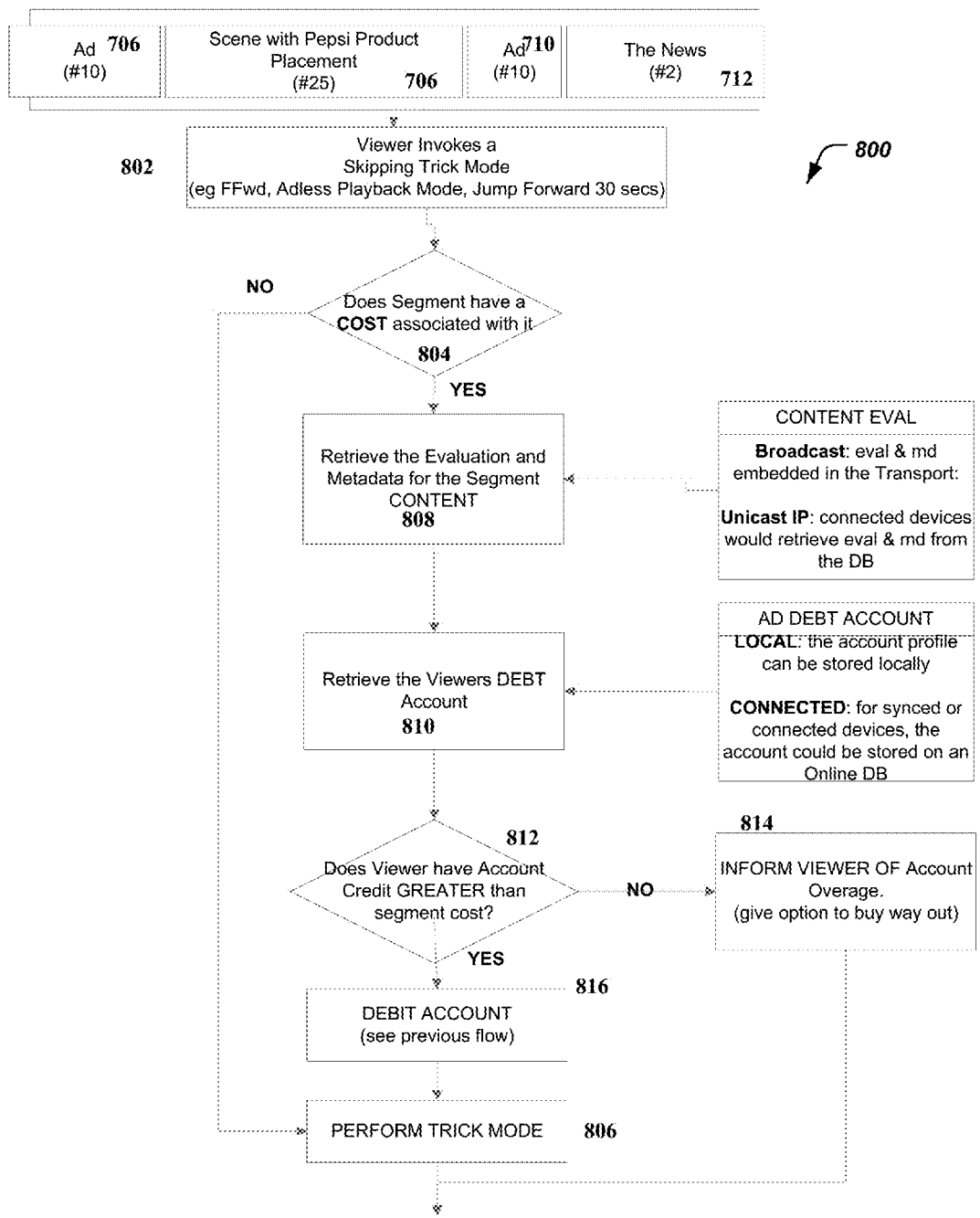
FIG. 8 depicts an example process of conditionally skipping advertisements during playback.

FIG. 8 depicts an example method 800 of conditionally skipping advertisements during playback. At 802, a program in a containerized format 704, previously described with respect to FIG. 7, is being presented to the user. At the time of the presentation the user may invoke a trick mode such as fast forwarding, activating an ad-free playback mode, skipping ahead by 30 seconds, etc. At 804, the method 800 determines if the segment being subject to trick mode has an associated evaluation that indicates that there is a cost associated with the segment. If there is no cost associated with the segment, then the method 800 allows the user device to carry on with performing the user-desired trick mode. If there is a cost associated with the segment, then, at 808, the method 800 retrieves the evaluation and the metadata for the segment content. At 810, the method 800 retrieves a user's balance from the user's debt account. At 812, the method 800 compares the segment cost with the user's balance to determine if the user has a balance in the Ad debt account that is greater than or equal to the cost of the segment. If not, at 814, the method 800 informs the user that trick mode cannot be enabled due to lack of sufficient balance in the ad debt account. The method 800 may additionally display options for user to purchase credit for adding to the user's debt account or for trading with another user to receive the credit. If the result of determination at 812 is that the user has sufficient balance in his account, at 816, points are subtracted from the debt account (e.g., using the method 700). In step 806, the user device is allowed to perform the desired trick mode.

Figure 9:
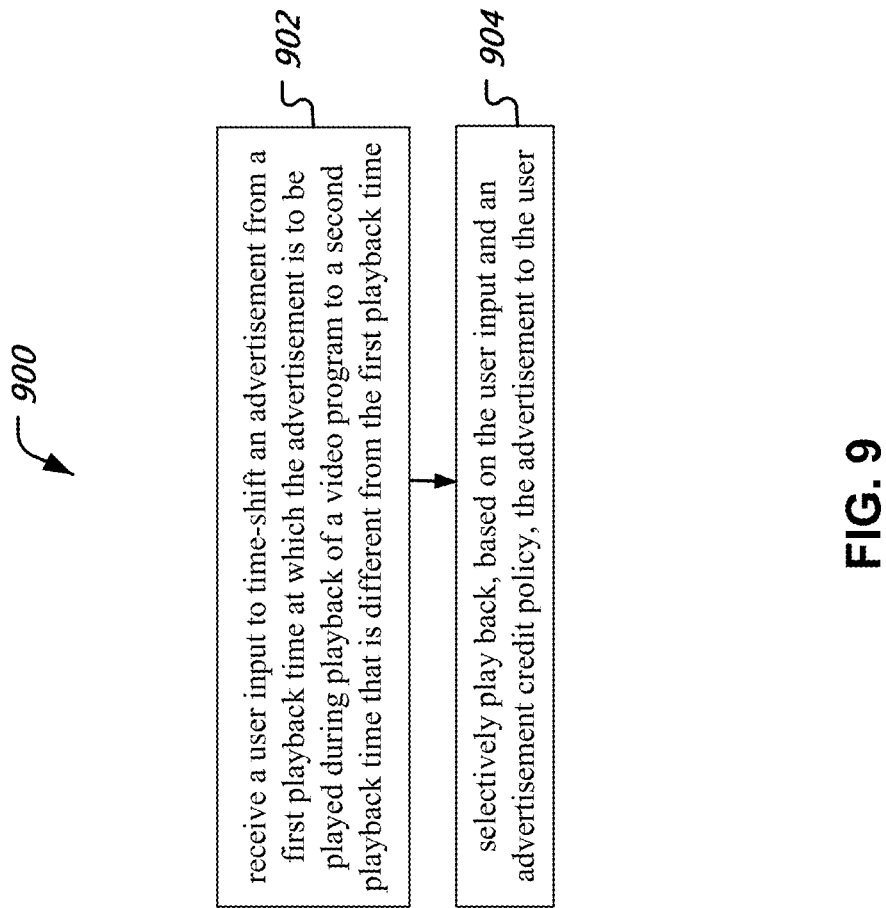
FIG. 9 is a flowchart representation of a method of allowing a user to time-shift advertisement when watching content.

FIG. 9 depicts a flowchart representation of a method 900 for allowing a user to control a time for playback of an advertisement.

At 902, the method 900 receives a user input to time-shift an advertisement from a first playback time at which the advertisement is to be played during playback of a video program to a second playback time that is different from the first playback time.

At 904, the method 900 selectively plays back, based on the user input and an advertisement credit policy, the advertisement to the user.

In some embodiments, the method 900 further generates an advertisement playback report after playing back the advertisement. The playback report may be transmitted to the Ad exchange server 410 or used locally to adjust the balance in the user's ad debt account based on the points earned (or spent).

In some embodiments, the method 900 may receive the video program and generate a segment table for the video program. The segment table includes an index to the advertisement that may be time-shifted (e.g., as described in FIG. 2).

In some embodiments, the method 900 may display visual controls to the user for time-shifting the advertisements. In some embodiments, the user may be able to exchange messages with the ad debt server 410 to check on his account balance, and trade, add or subtract points from the ad debt account. In some embodiments, the user may interact locally with the user device 102 to perform the account management functions.

In some embodiments, during program viewing, the user is made aware of the value of a show segment or an advertisement by presenting a visual icon on the display screen. The visual icon may, e.g., be a horizontal or vertical bar whose length is proportional to the value of the ad. In some embodiments, the user is made aware of an upcoming ad so that the user can make a decision about whether to watch the ad or skip it, prior to the time of presentation of the ad.

Figure 10:
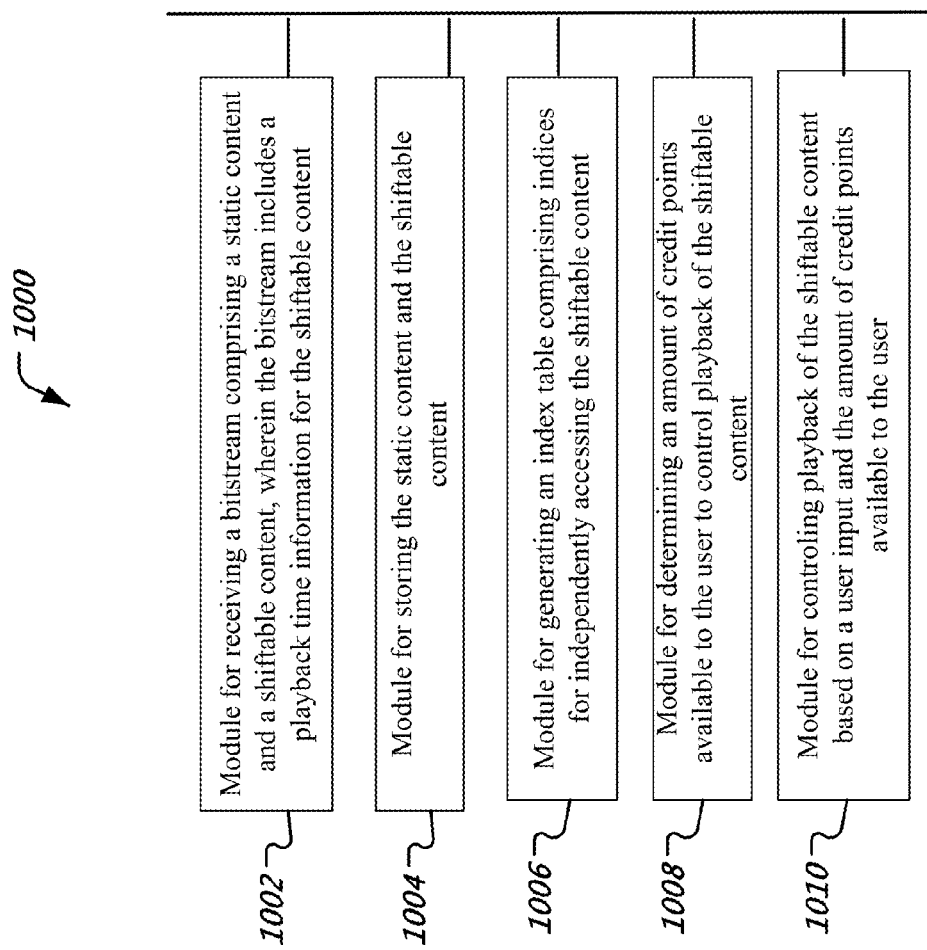
FIG. 10 is a block diagram representation of an apparatus for time-shifting advertisements.

FIG. 10 is a block diagram representation of an apparatus for content playback. The module 1002 (e.g., a content receiver module) is for receiving, from a content provider or a content delivery network, a bitstream comprising a static content and a shiftable content, wherein the bitstream includes a playback time information for the shiftable content. The module 1004 (e.g., a storage module) is for storing the static content and the shiftable content. The module 1006 (e.g., a bitstream analysis module) is for generating an index table comprising indices for independently accessing the shiftable content, e.g., as described with respect to FIG. 2. The module 1008 (e.g., a credit determination module) is for determining an amount of credit points available to the user to control playback of the shiftable content. The module 1010 (e.g., a playback control module) is for controlling playback of the shiftable content based on a user input and the amount of credit points available to the user. The apparatus 1000 and modules 1002, 1004, 1006, 1008 and 1010 may further be configured to implement some techniques disclosed in the present document.

In some embodiments, a network-side server apparatus may be used to control playback of static and shiftable content to a user. The server apparatus includes a bitstream receiver that receives a bitstream comprising a static content and a shiftable content. The bitstream may or may not identify or include playback time information for the shiftable content. A content store at the server may store the received bitstream in a storage device. A content segmenter at the network server may allow a user to perform segmentation of the received bitstream into static and shiftable segments. Alternatively, a module may perform the segmentation automatically using a segmentation algorithm that identifies audio or video content. As previously discussed with respect to FIG. 2, the segmentation may be logical, i.e., without moving data locations in the storage device or may copy data from one location in the storage device to another. An index generator at the network server may generate an index table comprising indices for independently accessing the shiftable content, e.g., as described with respect to FIG. 2. A credit determiner at the network server may determine the amount of credit points available to the user to control playback of the shiftable content. A streamer at the network server may control playback of the shiftable content based on a user input and the amount of credit points available to the user. The streamer may, e.g., refrain from streaming the shiftable content when the user has sufficient ad credit points to skip advertisements.

In some embodiments, the credit determiner increases the credit points available to the user for watching a portion of the shiftable content and reduces the credit points for every skipped portion of the shiftable content. In some embodiments, the static content includes a digital video program for a linear playback and the shiftable content includes an advertisement. In some embodiments, the network server also includes a credit exchanger that allows the user to perform accounting operations with the amount of credit points available to the user. In some embodiments, the accounting operations include checking, buying and selling the amount of credit points available to the user.

Figure 11:
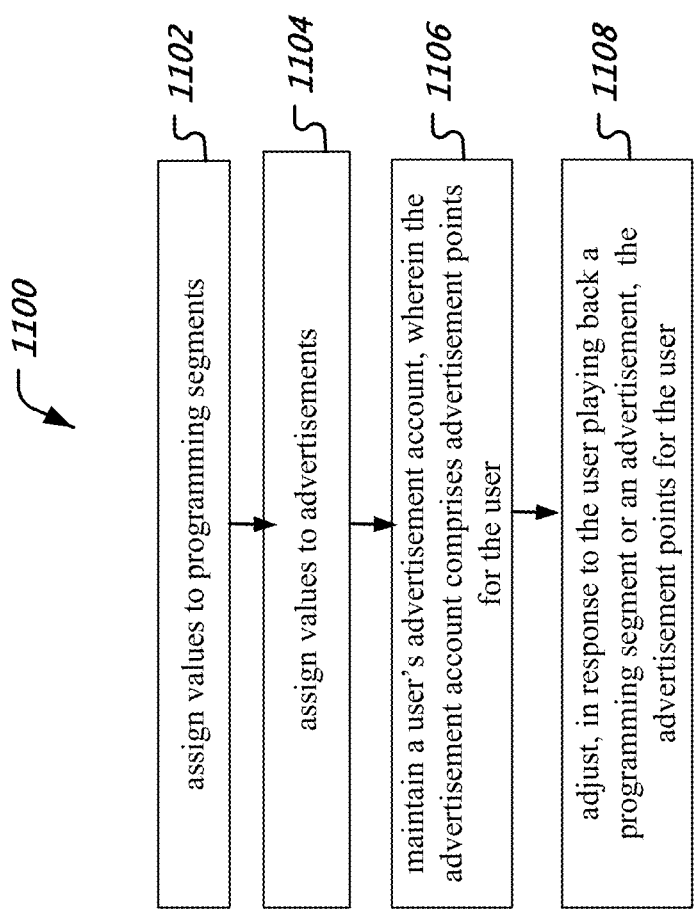
FIG. 11 is a flowchart representation of a method of operating an ad exchange.

FIG. 11 depicts a flowchart representation of a method 1100 for managing advertisement playbacks in a content network. The method 1100 may, e.g., be implemented at the server 410.

At 1102, the method 1100 assigned values to programming segments. The value assignments may be performed, e.g., as disclosed with respect to FIG. 5.

At 1104, the method 1100 assigned values to advertisements. The value assignments may be performed, e.g., as disclosed with respect to FIG. 6.

At 1106, the method 1100 maintains a user's advertisement account, wherein the advertisement account comprises advertisement points for the user. Various embodiments of a user's advertisement account (ad debt account) have been previously described.

At 1108, the method 1100 adjusts, in response to the user playing back a programming segment or an advertisement, the advertisement points for the user. In some embodiments, the method 1100 receives an ad or content playback report from the user device 102 from time to time (e.g., once every day or after a user finishes watching a television show). The content playback report may include details of which segments were played back by the user and which segments were time-shifted or skipped. Based on a unique identification associated with each program segment or block, the method 1100 is able to determine an ad credit value associated with the segment. In some embodiments, the user's viewing report may be generated by a content network provider's headend.

As previously described in some embodiments, the method 1100 may adjust a user's ad debt account by crediting points corresponding to the value assigned to a programming segment, when the user plays back the programming segment or the advertisement. In some embodiments, the method 1100 may adjust a user's ad debt account by crediting advertisement points corresponding to the value assigned to an advertisement when the user plays back the programming segment or the advertisement. In some embodiments, the method 1100 may adjust a user's ad debt account by debiting points corresponding to the value assigned to an advertisement when the user skips watching the advertisement or when the user fast forwards the advertisement.

In some embodiments, the method 1100 further allows a viewer, using his user device 102, to interact with the ad debt account and perform status check and management functions, as previously described. For example, the user may be able to transfer his ad viewing points to another user, or may be able to borrow points from other user's account upon permission from the other user.

Figure 12:
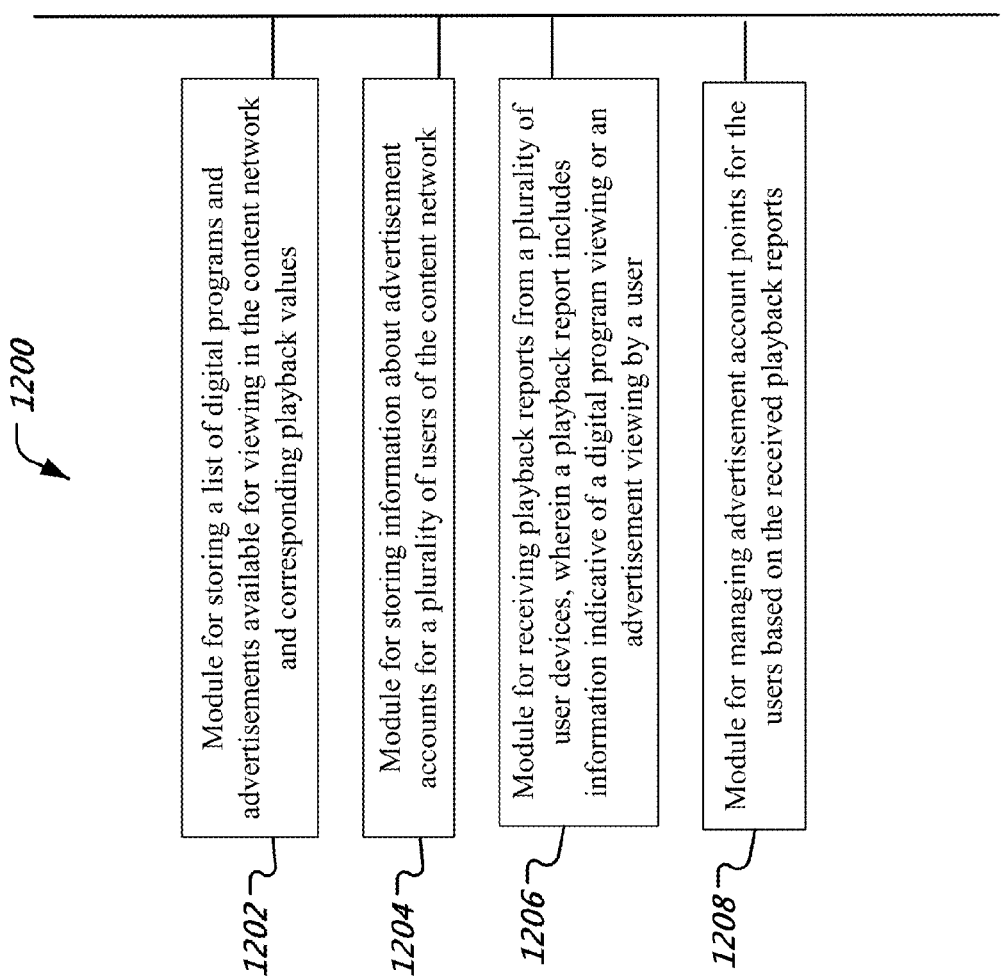
FIG. 12 is a block diagram representation of an ad exchange apparatus.

FIG. 12 is a block diagram representation of an apparatus 1200 operable in a content network. The apparatus 1200 may perform function of an ad exchange server, as previously described. The module 1202 is for storing a list of digital programs and advertisements available for viewing in the content network and corresponding playback values. The module 1204 is for storing information about advertisement accounts for a plurality of users of the content network. The module 1206 is for receiving playback reports from a plurality of user devices, wherein a playback report includes information indicative of a digital program viewing or an advertisement viewing by a user. The module 1208 is for managing advertisement account points for the users based on the received playback reports. The apparatus 1200 and modules 1202, 1204, 1206, and 1208 may further be configured to implement some of the techniques described in this document.

It will be appreciated that techniques have been disclosed using which advertisements included in a stored digital video program can be identified and indexed. A user can time shift the advertisements to play out at a different relative time position in the program or not play the advertisement at all, thereby incurring an advertisement debt. The advertisement debt can be offset by viewing ads, trading the debt with other users or by paying for the debt in another form.

It will further be appreciated that an advertisement exchange server is disclosed for allowing a user or multiple users to credit and debit their ad viewing points and trade the ad viewing points between different programs or among different users.

The disclosed and other embodiments, the functional operations and modules described in this document (e.g., a content receiver module, a storage module, a bitstream analysis module, a credit determination module, a playback control module, a credit exchange module, etc.) can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As a specific example, an example processing code is included below to illustrate one implementation of the above disclosed processing.

TABLE I

An Example Processing Code
An Example Processing Code

```
/* Source media stream read from a file or a transport stream
with a guaranteed EOF marker */
MediaStream source;
/* A container to hold the content to be shifted */
MediaStream[ ] shiftContent;
/* A container to hold the content NOT to be shifted */
MediaStream[ ] staticContent;
/* This enumeration stores directions on how the content should
be shifted. This could be a user-requested option, a cable/sat
provider's mandate, of a combination of both. */
enum exchangeOption;
/* Stream to play back */
MediaStream playbackStream;
MediaStream debtStream;
/* This function employs a library to identify the content that
should be shifted (e.g. commercials,) stores each shiftable clip
in its container, and then passes that container out. The clips
on static content (e.g. TV Show) that are created by removing the
shiftable content are then stored and passed-out in another
container. */
extractShiftableContent(  source,
                          &shiftContent,
                          &staticContent);
/* This is where the system decides how to process the newly
separated content. The option variable has been set according to
the process discussed above. Here, the system will handle three
possible options but several more options for re-sorting the
content may be possible here. */
switch(exchangeOption){
    /* This option shifts all the shiftable content to the
    beginning of the playback stream while informing the system
    that manages the contents storage and playback to disable
    trick modes during the playback of the shiftable content. */
    case ALL_TO_FRONT:
        /* Running time of the shifted content */
        long shiftedContentRuntime;
        /* Process the shifted content */
```

TABLE I-continued

An Example Processing Code
An Example Processing Code

```
    foreach (clip : shiftContent)
    {
        /* Get the running time of the clip and add to the
        total running time */
        shiftedContentRuntime+=duration(clip);
        /* Concatenate the shifted content onto the
        playback stream */
        append(clip, &playbackStream);
    }
    foreach(clip : staticContent)
    {
        /* Concatenate the core content onto the playback
        stream */
        append(clip, &playbackStream);
    }
    /* Disable the user's ability to fast-forward through
    shifted content */
    disableTrickMode(   playbackStream,
                        0, /* from beginning */
                        shiftedContentRuntime);
break;
/* This option shifts content into two groups, one at the
beginning of the playback and one in the middle */
case TWO_GROUPS:
    /* Running time for each block of the shifted content
    */
    long shiftedContentRuntime0;
    long shiftedContentRuntime1;
    long startBlockTwo;
    /* Number of clips */
    int numOfShiftedClips = length(shiftContent);
    int numOfStaticClips = length(staticContent);
    /* load shifted group 1 */
    for(i = 0 ; i < numOfShiftedClips/2 ; i++)
    {
        clip = shiftContent[i];
        shiftedContentRuntime0+=duration(clip);
        append(clip, &playbackStream);
    }
    /* Keep track of the starting point of shifted block 2
    */
    startBlockTwo = shiftedContentRuntime0;
    /* load static group 1 */
    for(i = 0 ; i < numOfStaticClips/2 ; i++)
    {
        clip = staticContent[i];
        startBlockTwo +=duration(clip);
        append(clip, &playbackStream);
    }
    /* load shifted group 2 */
    for( i = numOfShiftedClips/2 ;
         i < numOfShiftedClips ;
         i++)
    {
        clip = shiftContent[i];
        shiftedContentRuntime1+=duration(clip);
        append(clip, &playbackStream);
    }
    /* load static group 2 */
    for( i = numOfStaticClips /2 ;
         i < numOfStaticClips;
         i++)
    {
        clip = staticContent[i];
        append(clip, &playbackStream);
    }
    /* Disable the user's ability to fast-forward through
    shifted content in block 1 */
    disableTrickMode(   playbackStream,
                        0, /* from beginning */
                        shiftedContentRuntime0);
    /* Disable the user's ability to fast-forward through
    shifted content in block 2*/
    disableTrickMode(   playbackStream,
                        startBlockTwo,
                        startBlockTwo +
                    shiftedContentRuntime);
```

TABLE I-continued

An Example Processing Code
An Example Processing Code

```
        break;
    /* This option removes the shiftable content from the
    playback stream and adds it to a debt management system.
    This system would impose methods of reducing debt and penal
    */
    case ADD_TO_DEBT
        foreach (clip : shiftContent)
        {
            /* Concatenate the shifted content onto the debt
            stream */
            append(clip, & debtStream);
        }
        foreach(clip : staticContent)
        {
            /* Concatenate the core content onto the playback
            stream */
            append(clip, &playbackStream);
        }
        addDebt(debtStream, playbackStream);
        break;
}
/* play the stream */
play(playbackStream);
```

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A computer-implemented method of allowing a user to control playback of an advertisement, said method comprising:

inputting, at a processor, a playback option for time-shifting a playback of the advertisement from a first playback time, corresponding to a first time at which the advertisement is located at a first position in a content stream, to a second playback time, corresponding to a second time to which to shift the advertisement;

determining, at the processor, whether time-shifting of the advertisement is allowable, the determining comprising determining whether the user has an amount of credit equal to or greater than an amount of credit required to control playback of the advertisement, wherein the amount of credit required to control playback of the advertisement is based on an assigned value of the advertisement, the assigned value of the advertisement being based at least in part on at least one of information about the user, and a characteristic related to viewing of the advertisement by the user, the characteristic being separate from a duration of the advertisement; and in response to determining that time-shifting of the advertisement is allowable, using at the processor a data structure to independently access the advertisement and segments of the program in the content stream to generate a modified program content stream comprising the program and the advertisement, wherein the advertisement is located in the modified program content stream at the second playback time.

2. The method of claim 1, further comprising increasing the credit available to the user when the advertisement is played back to the user.

3. The method of claim 1, further comprising:
allowing the user to skip playing the advertisement during playback of the modified program content stream when it is determined that skipping of the advertisement is allowable; and
decreasing the credit available to the user due to skipping the advertisement.

4. The method of claim 1, further comprising displaying to the user visual controls for time-shifting the advertisement.

5. The method of claim 1, wherein the advertisement is shifted such that it is at the beginning of the modified program content stream.

6. The computer-implemented method of claim 1, wherein the data structure includes indices for each segment of the program and the advertisement, the indices dividing the content stream into one or more blocks of shiftable content and blocks of non-shiftable content.

7. The computer-implemented method of claim 6, wherein the content stream includes metadata that indicates whether each block is shiftable.

8. The computer-implemented method of claim 6, further comprising the step of determining by the processor whether each block is shiftable using an artificial intelligence algorithm.

9. The computer-implemented method of claim 6, wherein the modified program content stream is generated by placing the blocks of non-shiftable content into the modified program content stream in an order in which the blocks of non-shiftable content appear in the content stream, and placing the block of shiftable content into the modified program content stream at a location relative to the one or non-shiftable blocks corresponding to the second playback time.

10. A content playback apparatus comprising:
a memory for storing a content stream;
a processor programmed to manage playback of advertisements by:
inputting a playback option for time-shifting a playback of the advertisements from original playback times, corresponding to a first times at which the advertisements are located in first positions in the content stream, to second playback times;
corresponding to second times to which to shift the advertisements to second positions in the content stream;
determining whether time-shifting of the advertisements is allowable, the determining comprising determining whether a user has an amount of credit equal to or greater than an amount of credit required to control playback of the advertisement, wherein the amount of credit required to control playback of the advertisement is based on an assigned value of the advertisement, the assigned value of the advertisement being based at least in part on at least one of information about the user and a characteristic related to viewing of the advertisement by the user, the characteristic being separate from a duration of the advertisement; and in response to determining that time-shifting of the advertisements is allowable, using a data structure to independently access the advertisements and segments of a program included in the content stream to generate a modified program content stream comprising the program and the advertisements, wherein the advertisements are inserted into the modified program content stream at the second playback time.

11. The apparatus of claim 10, wherein the processor is further adapted to increase the credit available to the user when the advertisements are played back to the user.

12. The apparatus of claim 10, wherein the processor is further adapted to:

allow the user to skip playing the advertisements during playback of the modified program content stream when it is determined that skipping of the advertisements is allowable; and decrease the credit available to the user due to skipping the advertisements.

13. The apparatus of claim 10, wherein the processor is further adapted to display to the user visual controls for time-shifting the advertisements.

14. The apparatus of claim 10, wherein the processor generates the modified program content stream by:

receiving the program; and independently access generating an index table for the program, wherein the index table includes indices to the advertisements.

15. The apparatus of claim 10, wherein the advertisements are shifted to the beginning of the modified program content stream.

16. A content playback apparatus comprising:

a processor programmed to manage playback of stored content comprising static content and a time-shiftable content by:

inputting a playback option for time-shifting a playback of the shiftable content from a first playback time corresponding to a first time at which the shiftable content is located at a first position in a content stream to a second playback time corresponding to a second time to which to shift the shiftable content that is different from the first playback time;

determining whether time-shifting of the shiftable content is allowable, the determining comprising determining whether a user has an amount of credit equal to or greater than an amount of credit required to control playback of the shiftable content, wherein the amount of credit required to control playback of the shiftable content is based on an assigned value of the shiftable content, the assigned value of the shiftable content being based at least in part on at least one of information about the user and a characteristic related to viewing of the advertisement by the user, the characteristic being separate from a duration of the shiftable content; and in response to determining that time-shifting of the shiftable content is allowable, using a data structure to independently access the shiftable content and the static content to generate a modified program content stream comprising the shiftable content and the static content, with the shiftable content located in the modified program content stream at the second playback time.

17. The apparatus of claim 16, wherein the processor is further adapted to increase the credit points available to the user when the shiftable content is played back to the user.

18. The apparatus of claim 16, wherein the processor is further adapted to:

allow the user to skip playing the shiftable content during playback of the modified program content stream when it is determined that skipping of the shiftable content is allowable; and decrease the credit points available to the user due to skipping the shiftable content.

19. The apparatus of claim 16, wherein the processor is further adapted to display to the user visual controls for time-shifting the shiftable content.

20. The apparatus of claim 16, wherein the shiftable content is shifted to the beginning of the modified program content stream.

* * * * *